United States Patent
Yamazaki et al.

(10) Patent No.: US 6,708,130 B1
(45) Date of Patent: Mar. 16, 2004

(54) PRODUCT QUALITY INFORMATION MANAGEMENT SYSTEM

(75) Inventors: Yasuo Yamazaki, Tokyo (JP); Masaki Majima, Tokyo (JP)

(73) Assignees: Nippon Chemical Industrial Co., Ltd., Tokyo (JP); The Institute of Japanese Union of Scientist Engineers, Tokyo (JP)

( * ) Notice: Subject to any disclaimer, the term of this patent is extended or adjusted under 35 U.S.C. 154(b) by 0 days.

(21) Appl. No.: 10/111,415
(22) PCT Filed: Nov. 8, 2000
(86) PCT No.: PCT/JP00/07829
§ 371 (c)(1), (2), (4) Date: May 6, 2002

(30) Foreign Application Priority Data

Nov. 8, 1999 (JP) .............................. 11-316538

(51) Int. Cl.[7] .................. G06F 19/00; G06F 11/00
(52) U.S. Cl. .................. 702/82; 702/35; 702/185; 702/187; 714/38
(58) Field of Search .................. 702/81, 82, 182, 702/183, 184, 185, 187; 700/108, 109, 110, 111; 714/38

(56) References Cited

U.S. PATENT DOCUMENTS 5,225,996 A * 7/1993 Weber .................. 702/187
5,245,554 A * 9/1993 Tsuyama et al. .............. 702/185
5,682,473 A * 10/1997 Carson et al. .................. 714/38
5,801,965 A * 9/1998 Takagi et al. .................. 702/35

FOREIGN PATENT DOCUMENTS

JP          8-263552          10/1996

* cited by examiner

Primary Examiner—Michael Nghiem
Assistant Examiner—John Le
(74) Attorney, Agent, or Firm—Armstrong, Kratz, Quintos, Hanson & Brooks, LLP

(57) ABSTRACT

When product inspection results and an inspection frequency for each inspection item are input to the product inspection result input device 1, the inspection items are selected, the presence or absence of product inspection results required for each inspection item is determined, selection of previous product inspection results is performed via the inspection item master 2a and inspection frequency master 2b of the product standard management device 2, and product inspection results for other product batches measured previously are cited for insufficient data for each inspection item missing from the inspection results document according to the inspection item conditions of the inspection results document. Next, an overall pass-fail determination is performed by comparing the product inspection results and input from the product inspection result input device 1 for each inspection item and product inspection results cited for products of other batches, with product standards and tolerances stored in the inspection item master 2a for each inspection item for products for each customer.

2 Claims, 2 Drawing Sheets

PRODUCT QUALITY INFORMATION MANAGEMENT SYSTEM

FIELD OF THE INVENTION

This invention relates to an effective product quality information management system for products with little variation in quality characteristics for each manufacturing process. More specifically, this invention relates to a product quality information management system which determines pass or fail of the product quality of production batches based on the results of inspections and non-experimental inspections defined in the standards and which can control product quality in a product quality analysis which includes inspection items analyzed with different frequencies.

BACKGROUND OF THE INVENTION

Conventionally, in the manufacturing industry and the like, products manufactured in-house are usually inspected according to a defined product standard. In such a quality inspection, statistical variations may differ for each inspection item. Whereas an inspection item with a large variation requires inspection of all batches, an inspection item with a low variation provides a statistical guarantee of quality even if the inspection frequency is low.

Thus, the analysis inspection frequency may be different for each item. For example, some inspections are performed on each production batch but other inspections are performed once a month, once a week or every day.

The inspection results document is a document on which inspection results for each quality characteristic are printed, and inspection results can be viewed on it. At the same time, the inspection results document is also a certificate which guarantees to the customer that the product having the specified mass (or capacity) of the product batch has passed inspection.

In the inspection results document, a manufacturer is also required to guarantee the product standard according to the analysis frequency.

In the prior art, when inspection results documents were issued for products having a different analysis frequency, a large number of data which were unnecessary to statistical calculation of the results, i.e., a large number of identical data, were recorded, and this appeared as inspection items with a small amount of variation.

In recent years, great demands are being made of manufacturers regarding their products, and records of inspection results documents for a manufactured product are the only proof which shows a manufacturer has not been negligent in the event of an accident or problem. However, if there is an erroneous entry by an inspector in the inspection results documents, there is not only the problem that the records cannot be used as proof that the manufacturer was not guilty of negligence. There is also the problem that, if defective products are shipped which are outside standard and tolerance values, and an accident or problem occurs due to their use, the manufacturer may have to take full responsibility. In view of the possibility of such a situation arising, the manufacturer must construct a reliable quality control system.

DISCLOSURE OF THE INVENTION

It is therefore an object of this invention to provide a product quality information management system which can make an overall pass-fail decision for every product batch on the quality of products with different inspection frequencies.

The product quality information management system according to this invention is a system which determines pass or fail by comparing an input product inspection result with a product standard, comprising an input device for inputting a product inspection result and an inspection frequency for each inspection item, an inspection result storage device which stores the product inspection result input from the input device, a product standard storage device which stores a product standard for each inspection item, an inspection item determining means which selects the inspection item, determines the presence or absence of a required product inspection result input for each inspection item and selects a product inspection result of a previous batch based on the product standard stored by the product standard storage device, and the inspection frequency input from the input device, and a pass-fail decision means which compares the product inspection result input from the input device and past product inspection result selected by the inspection item determining means with a product standard for each inspection item and performs an overall determination to determine pass-fail of the product.

It further comprises an issuing device which gives an inspection result document number only to a product which has passed the inspection by the pass-fail decision means, and issues an inspection result document, an inspection result document storage device which stores the issued inspection result document as electronic data, a search means which searches inspection result from the inspection result document number, and a write-once storage device which stores the issued inspection result document as electronic data on a write-once recording medium.

Therefore, pass-fail of product quality of products with different inspection frequencies can be determined by inspections according to product standards and inspection results for other batches measured in the past, which can be used for quality control of products with little variation in quality characteristics in the manufacturing steps.

PREFERRED EMBODIMENTS OF THE INVENTION

Hereafter, this invention will be described based on the appended drawings.

Figure 1:
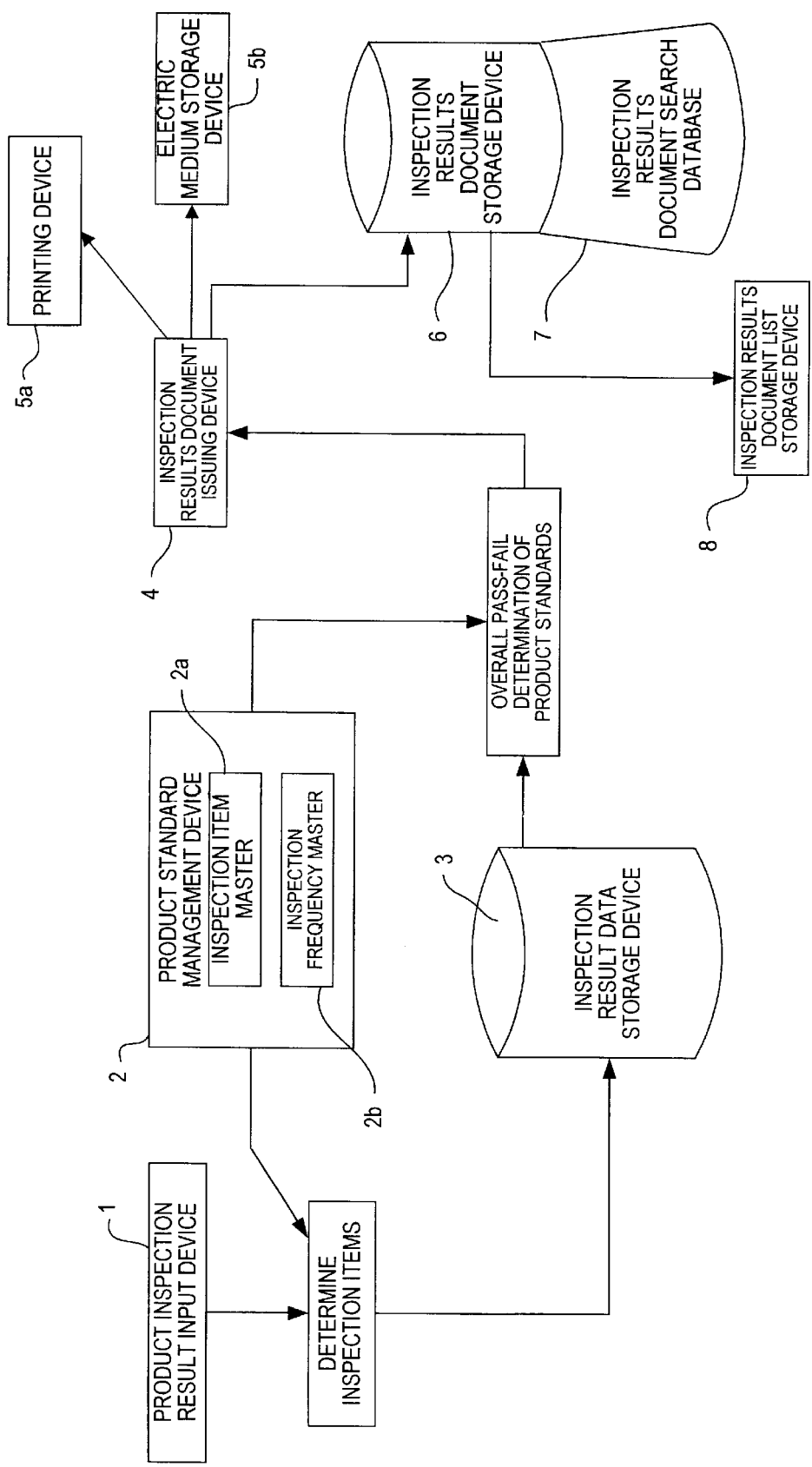
FIG. 1 is a block diagram showing the construction of a quality information management system according to this invention.
Figure 2:
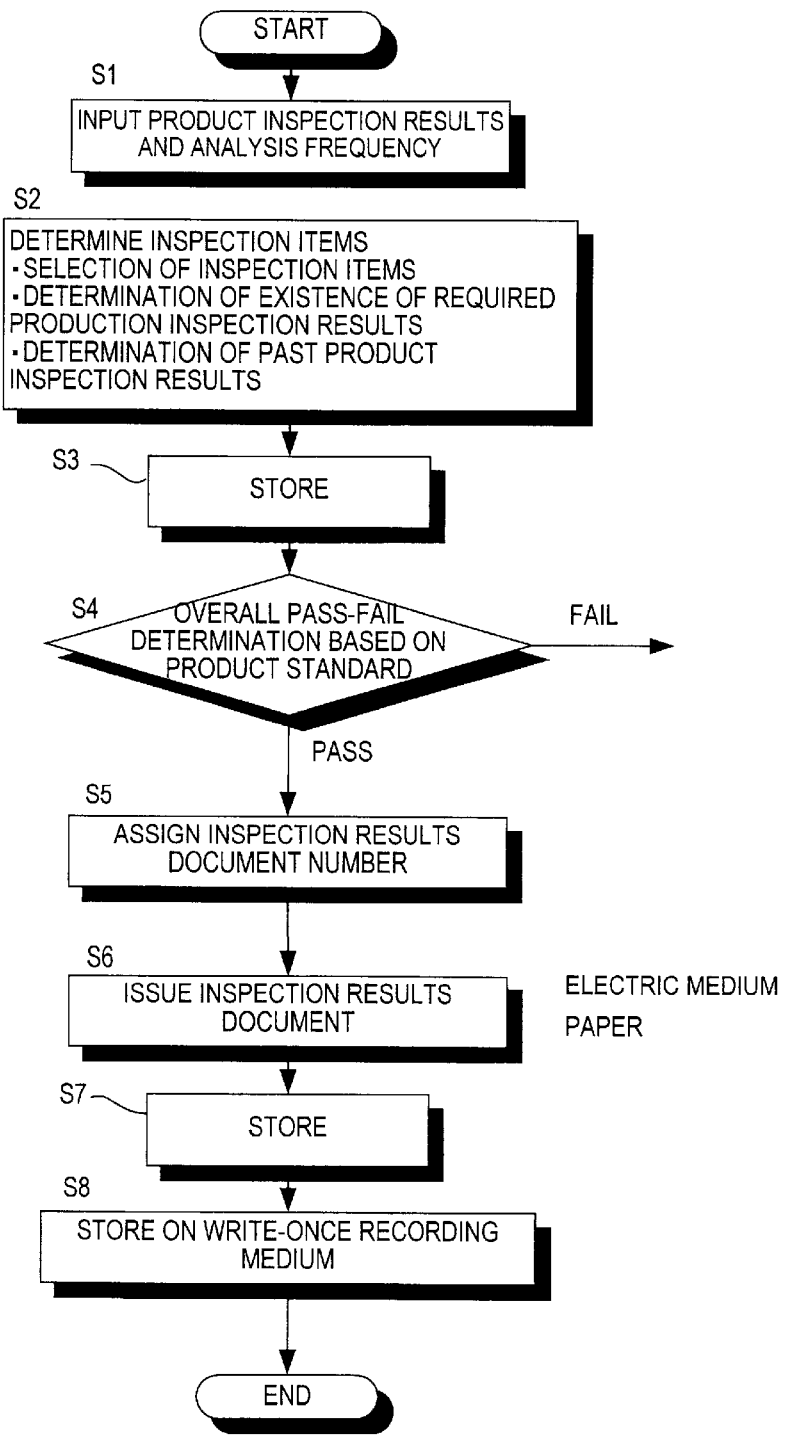
FIG. 2 is a work flow diagram of the quality information management system.

FIG. 1 shows the construction of the product quality information management system according to this invention, and FIG. 2 shows the work flow diagram of the product quality information management system, respectively.

The product inspection result input device 1 comprises a keyboard or the like, and it permits input of inspection results for each batch, inspection results for each sample, measured product inspection results such as inspection results for each product characteristic and analysis frequency. It also allows input of batch number, sample number, analyst code, manufacturing date, acceptance date, report date, number of required days and remarks.

Normally, analysis frequency means the input of a code such as S, L, W, M or R. When the product inspection results and analysis frequency for each inspection item are input into the product inspection results input device 1 (step S1), inspection items are selected, it is determined whether product inspection results required for each inspection item are present or absent, and selection of previous product inspection results is performed based on product standards in the inspection results documents via an inspection item master 2a and inspection frequency master 2b of a product standard management device 2 (step S2).

The quality standard management device 2 comprises the inspection item master 2a and inspection frequency master 2b.

The inspection item master 2a forms the product standard storage device of this invention, and comprises data such as product name, inspection item for each product, and product standard for each inspection item. The inspection item master 2a selects the inspection items for the product and determines the presence or absence of required data input for inspection items based on the product standard in the inspection results documents, and an overall pass-fail determination of product standards is performed in the subsequent overall product standard determination.

The inspection frequency master 2b performs selection of past inspection result data for inspection items for which there was no input data, using an operand according to the inspection frequency symbols input by the product inspection result input device 1.

For example, any of S, L, W, M, R are input into the inspection frequency column, and if the analysis frequency set for each quality characteristic when the standard value is input is A, and the analysis frequency set for each inspection when the inspection result is input is B. The magnitude relation for analysis frequency is S<L<W<M, and R is set so that it is not compared with another analysis frequency.

The analysis frequency A and analysis frequency B are compared, and for a quality characteristic where the analysis frequency A<the analysis frequency B, the inspection result is input. On the other hand, for a quality characteristic where the analysis frequency A≧analysis frequency B, the past inspection results are set to be displayed. The past inspection results are set so that inspection results for the analysis frequency B identical to those of the analysis frequency A are displayed.

Next, the product inspection results are transferred as a digital signal to the inspection result data storage device 3, and stored as electronic data (step S3).

An overall pass-fail determination is performed on the product inspection results stored in the inspection result data storage device 3, for product standards for each inspection item, from the results of an inspection and a non-experimental inspection specified by the product standards via the inspection item master 2a and inspection frequency master 2b of the quality standards management device 2 (step S4).

The results of the non-experimental inspection show the product inspection results for other product batches measured previously.

Specifically, when the product inspection results and inspection frequency for each inspection item are input to the product inspection result input device 1, the inspection items are selected, the presence or absence of product inspection results required for each inspection item is determined, selection of previous product inspection results is performed via the inspection item master 2a and inspection frequency master 2b of the product standard management device 2, and product inspection results for other product batches measured previously are cited for insufficient data for each inspection item missing from the inspection results document according to the inspection item conditions of the inspection results document. Next, an overall pass-fail determination is performed by comparing the product inspection results input from the product inspection result input device 1 for each inspection item and product inspection results cited from the products of other batches, with product standards and tolerances stored in the inspection item master 2a for each inspection item for products for each customer.

Next, only product inspection results which comply are transmitted as a digital signal to an inspection results document issuing device 4, and an inspection results document is issued.

Product inspection results which comply are a combination of the product inspection results input from the product inspection results input device 1 and product inspection results cited from the products of other batches.

Product inspection results which did not comply in the step S4 are stored as non-complying products in the inspection result data storage device 3.

The inspection results document records product name, customer name, shipping date, number of items shipped, batch number, inspection measurement items, standard values for inspection measurement items, inspection results and compliance or non-compliance.

In the inspection results document issuing device 4, an inspection results document number is automatically assigned to product inspection results which comply with the customer product standards in the issuing order of the inspection results document (step S5). The product inspection results to which the inspection result document number is assigned are printed as an inspection results document for the complying products in accordance with a predetermined customer format by a printing device 5a connected to the inspection results document issuing device 4, and issued (step S6).

The inspection results document for the complying products may be stored on a floppy disk or hard disk by an electronic medium storage device 5b connected to the inspection results document issuing device 4, and the inspection results document can be transmitted to the destination as an e-mail attachment.

The product inspection results to which the inspection results document number was assigned by the inspection results document issuing device 4 are stored by an inspection results document storage device 6 as a digital signal (step S7).

The inspection results document storage device 6 includes an inspection results document search database 7 which can search product inspection results related to the inspection results document number.

An inspection results document list storage device 8 is connected to the inspection results document storage device 6. The inspection results document list storage device 8 is a device for storing inspection results documents on a write-once recording medium such as a CD-R or DVD-R, for example, a CD-R device or DVD-R device.

The product inspection results to which the product results document number was assigned by the inspection results document issuing device 4, are stored by the inspection results document storage device 6, and also stored on the write-once recording medium by the inspection results document list storage device 8 (step S8).

In this product quality information management system, when the product is shipped to the user, the inspection results document with the inspection results document number, which was issued on paper by the printing device 5a, issued as electronic data by the electronic medium storage device 5b or issued both on paper and as electronic data, is retained by the user. On the company side, this inspection result document is stored as electronic data by the inspection results document storage device 6 and inspection results document list storage device 8, so the actual inspection results document can be retained on both sides.

If there was any tampering with the inspection results document data after the inspection results document was issued, the electronic data for the inspection results document stored in the inspection results document storage device 6 is searched and extracted from the inspection results document search database 7 based on the inspection results document number. By comparing this inspection results document with the details of the inspection results document retained by the user, tampering with the inspection results document data can easily be discovered.

Further, by storing and managing the contents of the inspection results document on the write-once storage medium by the inspection results document list storage device 8, the reliability of the inspection results document is improved. Thus, the product quality information management system of this invention can perform an overall pass-fail determination of product standards even when inspection frequency is low or inspection frequencies differ in the product quality management with very little variation in quality characteristics for each batch between steps in the product manufacturing process, and it is therefore possible to issue a reliable inspection results document to the destination.

Moreover, in the product quality information management system of this invention, the product inspection results stored in the inspection result data storage device 3, or the inspection results document stored on an electronic medium by the electronic medium storage device 5b, can easily be converted to the format for a spreadsheet program such as Microsoft Excel or Lotus 1-2-3, and used for quality management as customer electronic data.

Here, the quality information database system in which the system according to this invention is installed shall hereafter be referred to as PQCS (product quality control system).

Consider a product P, an industrial chemical liquid substance which is produced continually. The product P is stored in a product tank, and the product which accumulates on one day is referred to as a batch.

A 12-digit alphanumeric batch number which includes the date and identification code is assigned to each batch. One batch of the product P is produced in one day, and transport is designed so that different batches are not mixed together.

The product P is basically a stable chemical substance, and as the material used for the product tank has no effect on product quality, there is no variation of product quality during the storage period.

The quality of the product P may be displayed by inspecting four quality characteristics. The quality characteristics from first characteristic to fourth characteristic are the concentration of the product P, the amount of impurities it contains and the mole ratio, etc.

The concentration of the product P is directly proportional to the cost of the product P, so if the standard values are largely exceeded, costs increase and this also has an effect on customer applications. Therefore it is a quality characteristic which is desirable to be small within the range of the standard. On the other hand, the amount of impurities is a one-sided standard which is preferably close to non-detectable, i.e., to zero.

In many cases, there is a step to remove impurities, and it is obvious that if the process is controlled, this quality characteristic of impurity will not vary during repeat production from the experience gained over several tens of years. Further, it is desirable for industrial chemicals that the amount of impurities is zero regardless of whether there is a standard or not.

As this is a substance produced by chemical reaction, in the case of a simple molecular structure, the molar ratios of specific elements is a quality characteristic which is obviously theoretically constant. For this product P, a rational, statistical quality control is performed by varying the inspection frequency for each quality characteristic. Here, an inspection is performed where the inspection frequency of the first characteristic is L, the inspection frequency of the second characteristic is W, the inspection frequency of the third characteristic is M and the inspection frequency of the fourth characteristic is R. Each time a batch is completed, a sample is sent from the production department to the inspection department.

The first characteristic of inspection frequency L is analyzed for each batch, and the batch number and analysis results of the first characteristic are input to the PQCS. For the second characteristic, the inspection frequency is W, so the sample for Monday is analyzed, and a batch number and analysis results for the first characteristic and second characteristic are input to the PQCS.

The inspection frequency of the third characteristic is M, so a sample for the first of each month is analyzed, and the batch number and analysis results for the first characteristic, second characteristic and third characteristic are input to the PQCS. The inspection frequency of the fourth characteristic is R, so a sample is normally taken every six months, and the batch number and analysis results for the characteristic, second characteristic, third characteristic and fourth characteristic are input to the PQCS.

When quality problems arise due to a change-over of material or an improvement of a process, all inspection items are analyzed regardless of the specified analysis frequency. In this case, the analysis results may be input to the PQCS.

Inspection results are important information for the production department, because the quality of the chemical currently being manufactured may be affected.

For the data input to the PQCS, company products standards are laid down for the first to fourth characteristics, and a pass-fail determination is performed. The company product standards are internal standards for production control and the customer product standards are external standards relating to delivery standards to the customer. The company products standards must be at least as rigorous as the customer product standards.

The product quality is realized taking account of the variation between batches.

Considering the statistical process, it is a problem if data other than the measured inspection results is input. Only results inspected according to the inspection frequency are input to the PQCS, so there is no concern here.

In this way, the pass-fail of a product is determined overall when it is shipped using results inspected according to the inspection frequency, so only products which comply are shipped.

For the first characteristic of inspection frequency L, pass-fail is determined by looking up the analysis results for the present batch and the customer product standards. For the second characteristic of inspection frequency W, pass-fail is determined by looking up the analysis results for the present batch or the analysis results for the batch on the nearest Monday, and the customer product standards. For the third characteristic of analysis frequency M, pass-fail is determined by looking up the analysis results for the present batch or the analysis results for the batch on the first of the corresponding month, and the customer product standards.

For the fourth characteristic of analysis frequency R, pass-fail is determined by looking up the analysis results for the present batch or the analysis results for the nearest batch, and the customer product standards.

As the product complies with the company standards which are at least as rigorous as the customer products standards, it necessarily satisfies customer product standards. Hence, products which satisfy all standards specified in the customer product standards are deemed to "pass" in the overall determination, and can be shipped.

DETERMINATION RESULTS

The product P was manufactured on Tuesday, Apr. 13, 1999, and its batch number was "990413H02". The first characteristic of the product P was an item showing product concentration, and was defined to be from 85.5% to 86.0% in the product standards. The measurement result was 85.6%, so the product passed.

The second characteristic was an item showing the amount of an impurity A in the product, and was defined to be less than 10 ppm in the product standards. The ordinary inspection result gave 0.5 ppm with a standard deviation of 0.2 ppm, and this item was the analysis frequency W. The analysis value for batch "990412H02" manufactured on April 12 which was the nearest Monday to the manufacturing date of batch "990413H02" which was inspected, was 0.5 ppm, so the product passed.

The third characteristic was an item showing the amount of an impurity B in the product, and was defined to be less than 10 ppm in the product standards. The ordinary inspection result gave 0.05 ppm with a standard deviation of 0.01 ppm, and this item was the analysis frequency M. The analysis value for batch "990401H02" manufactured on April 1 which was the first day of the month of the manufacturing date of batch "990413H02" which was inspected, was 0.05 ppm, so the product passed.

The fourth characteristic was an item showing the amount of an impurity C in the product, and was defined to be less than 1 ppm in the product standards. The ordinary inspection result was "not detected", and this item had the analysis frequency R. The analysis value for batch "990410H02" which was the nearest batch inspected for the fourth characteristic, was "not detected", so the product passed. The non-detection level in fourth characteristic was 0.001 ppm or less.

The product P complied with company product standards and also with customer product standards, so it could be shipped.

INDUSTRIAL APPLICABILITY

As described above, according to this invention, a pass-fail of product quality for a present batch with different inspection frequencies, can be determined overall from inspections specified by product standards and the results of non-experimental inspections. This can be used for quality control of products with small variation of quality characteristics in manufacturing processes in the chemical industry.

What is claimed is:

1. A product quality information management system which determines pass or fail by comparing an input product inspection result with a product standard, comprising:

an input device for inputting a product inspection result and an inspection frequency for each inspection item, an inspection result storage device which stores the product inspection result input from the input device, a product standard storage device which stores a product standard for each inspection item, inspection item determining means which selects the inspection item, determines the presence or absence of a required product inspection result input for each inspection item and selects a product inspection result of a previous batch based on the product standard stored by the product standard storage device, and the inspection frequency input from the input device, and pass-fail decision means which compares the product inspection result input from the input device and past product inspection result selected by the inspection item determining means with a product standard for each inspection item and performs an overall determination to determine pass-fail of the product.

2. A product quality information management system which determines pass or fail by comparing an input product inspection result with a product standard, comprising:

an input device for inputting a product inspection result and an inspection frequency for each inspection item, an inspection result storage device which stores the product inspection result input from the input device, a product standard storage device which stores a product standard for each inspection item, inspection item determining means which selects the inspection item, determines the presence or absence of a required product inspection result input for each inspection item and selects a product inspection result of a previous batch based on the product standard stored by the product standard storage device, and the inspection frequency input from the input device, pass-fail decision means which compares the product inspection result input from the input device and past product inspection result selected by the inspection item determining means with a product standard for each inspection item and performs an overall determination to determine pass-fail of the product, an issuing device which gives an inspection result document number only to a product which passed the inspection by the pass-fail decision means, and issues an inspection result document, an inspection result document storage device which stores the issued inspection result document as electronic data, a search means which searches an inspection result from the inspection result document number, and a write-once storage device which stores the issued inspection result document as electronic data on a write-once recording medium.

* * * * *